(12) United States Patent
Sobieszek et al.

(10) Patent No.: US 10,731,771 B2  
(45) Date of Patent: Aug. 4, 2020

(54) FLOW LIMITER VALVE

(71) Applicant: Hamilton Sundstrand Corporation, Charlotte, NC (US)

(72) Inventors: Maciej Sobieszek, Wrocław (PL); Mateusz Gabka, Odolanów (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/404,391

(22) Filed: Jan. 12, 2017

(65) Prior Publication Data  
US 2017/0261118 A1 Sep. 14, 2017

(30) Foreign Application Priority Data  
Mar. 14, 2016 (EP) .................... 16160123

(51) Int. Cl.  
*F16K 31/122* (2006.01)  
*F16K 17/30* (2006.01)  
*F16K 1/12* (2006.01)

(52) U.S. Cl.  
CPC .......... *F16K 31/1221* (2013.01); *F16K 1/126* (2013.01); *F16K 17/30* (2013.01)

(58) Field of Classification Search  
CPC ......... Y10T 137/7727; Y10T 137/7728; Y10T 137/7785; Y10T 137/7792; Y10T 137/7834; Y10T 137/785; F16K 31/1221; F16K 1/126; F16K 17/30  
See application file for complete search history.

(56) References Cited

U.S. PATENT DOCUMENTS

| | | | | | |
|---|---|---|---|---|---|
| 2,093,015 | A | * | 9/1937 | Madden | ................. B60T 11/32 137/465 |
| 2,960,109 | A | * | 11/1960 | Wilson | ................. G05D 7/0133 137/513.3 |
| 2,984,261 | A | * | 5/1961 | Kates | ................. G05D 7/0133 137/504 |
| 4,347,867 | A | * | 9/1982 | Peters | ................. F16K 17/34 137/460 |

(Continued)

FOREIGN PATENT DOCUMENTS

| JP | S60121371 | 6/1985 |
|---|---|---|
| WO | 2008019863 A1 | 2/2008 |

OTHER PUBLICATIONS

Google definition of "Surface" retrieved on May 8, 2019.*  
European Search Report for Application No. 16160123.2-1751, dated Sep. 6, 2016, 8 Pages.

*Primary Examiner* — Jessica Cahill  
(74) *Attorney, Agent, or Firm* — Cantor Colburn LLP

(57) ABSTRACT

A flow limiter valve assembly comprising a housing defined by an end cap and a guide base, a fluid inlet orifice provided in the base and a fluid outlet orifice in the circumferential wall of the housing, with a fluid flow path defined from the inlet orifice to the outlet orifice. The valve assembly further comprises a spool mounted in the base of the housing and arranged to be axially moveable relative to the housing end cap and biasing elements to bias the spool away from the end cap. When the spool is biased away from the end cap, the fluid flow path is defined by a gap between the end cap and the spool such that fluid can flow from the inlet orifice through this gap to the outlet orifice.

4 Claims, 8 Drawing Sheets

(56) References Cited

U.S. PATENT DOCUMENTS

| | | | | |
|---|---|---|---|---|
| 4,785,847 A | * | 11/1988 | Steer | B60T 8/265 |
| | | | | 137/505.25 |
| 4,867,198 A | * | 9/1989 | Faust | F16K 17/34 |
| | | | | 137/503 |
| 4,951,478 A | * | 8/1990 | McDonald | F25B 41/06 |
| | | | | 137/504 |
| 5,215,178 A | | 6/1993 | Bartlett | |
| 5,400,694 A | * | 3/1995 | Bartlett | F15B 13/01 |
| | | | | 60/466 |
| 5,462,081 A | * | 10/1995 | Perusek | F16K 17/30 |
| | | | | 137/498 |
| 7,111,638 B2 | * | 9/2006 | Johnson | F16K 17/34 |
| | | | | 137/460 |
| 7,434,595 B2 | * | 10/2008 | Schmitt | F16K 17/30 |
| | | | | 137/462 |
| 2008/0006330 A1 | | 1/2008 | Zhou | |
| 2010/0101666 A1 | | 4/2010 | Pechtold et al. | |
| 2015/0330474 A1 | | 11/2015 | Rubitzko et al. | |

\* cited by examiner

FLOW LIMITER VALVE

FOREIGN PRIORITY

This application claims priority to European Patent Application No. 16160123.2 filed Mar. 14, 2016, the entire contents of which is incorporated herein by reference.

TECHNICAL FIELD

The present disclosure relates generally to hydraulic valves and more particularly to a valve assembly for limiting fluid flow through the assembly.

BACKGROUND

Use of valve assemblies and flow control valves for controlling fluid flow from, e.g., power-assist pumps, is well known. The valve assembly provides for uniform flow of hydraulic fluid from the power-assist pump to, for example, an actuator or other fluid operated device.

Generally, a flow control valve comprises a housing having a bore therein forming a flow path between an inlet and an outlet port, with a slidably disposed sleeve or other member arranged to occlude the outlet port when fluid flow is to be prevented. This slidable member or sleeve is, conventionally, biased by means of a spring or the like.

In various known arrangements, the spring is arranged to ensure that, in the normal state, the flow path to the outlet port is open such that a fluid can flow to the inlet port, through the bore and out of the outlet port to control the actuator or the like. If, however, the fluid flow rate exceeds a desired rate, a pressure differential is created in the valve assembly to cause the sliding member to move against the force of the spring so as to occlude the outlet port or to otherwise cause relative movement in relation to the bore so that there is a non-alignment in the fluid flow path from the inlet through the bore to the outlet, thus preventing the flow of fluid through the valve assembly.

There are many applications of hydraulic power where there is a need to regulate the maximum rate of fluid flow. In aircraft applications, for example, the industry has specific safety regulations concerning the maximum flow rate.

Whilst, as mentioned above, hydraulic valves find many applications in a wide range of industries, the control valve in the present disclosure will be described, by way of example and not limitation, in relation to the use of hydraulic actuation systems in aircraft.

Many moving parts in aircraft are controlled using hydraulics. In view of the very high safety requirements in aircraft, such hydraulic systems include a maximum flow requirement. The flow limiter of the present disclosure can be used in any hydraulic system as a flow control valve, wherever there is a requirement for limiting a flow rate.

The specific examples described below relate to the use of a flow control valve in a thrust reverser hydraulic system but this is purely by way of example.

FIGS. 1A and 1B, described again below, show, in cross-section, a conventional flow limiter valve such as might be used in a thrust reverser actuation system.

The flow limiter valve shown in FIGS. 1A and 1B comprises a housing 4 containing a spool 5 arranged on a guide 6 such as to be axially moveable within the housing.

Fluid flows through the flow limiter valve by entering the valve at the input orifice 1, passing through a bore in the sliding spool and exiting at output orifice 3 in the circumferential wall of the housing, via an outlet 2 in the spool.

The sliding spool 5 is biased, by means of a spring 7 such that, under normal flow conditions, the spool outlet 2 is aligned with the output orifice 3 in the wall of the housing. Thus, a flow conduit or path for the fluid is provided from input orifice 1, via the bore and outlet 2 through output orifice 3.

Should the fluid flow exceed a given flow rate or pressure, this creates a pressure differential across the input orifice such as to overcome the spring bias, causing compression of the spring such that the sliding spool moves axially moving the spool outlet out of alignment with the outlet orifice 3. This thus closes off the flow path through the valve. FIG. 1A shows the spool outlet in alignment with the outlet orifice creating a flow path. FIG. 1B shows the slide spool orifice moved out of alignment with the outlet orifice thus closing the fluid flow path.

As can be seen by comparing FIGS. 1A and 1B, to stop flow through the valve assembly, the sliding spool needs to move a distance X (FIG. 1B). This fairly large distance of movement against the force of the spring means that the flow limiting valve responds slower than is desirable to an excessive pressure difference and flow rate. The mass of the sliding spool also needs to be fairly large to move the distance X. This mass results in some lack of stability causing transient spikes in flow rate.

Also, a shorter spool distance results in lower viscous friction force as well as dry friction force.

The aim of the present disclosure is to provide a flow limiter valve that responds more quickly to the flow rate and, hence, pressure differential, exceeding a given value, and in a more stable manner.

SUMMARY

The present disclosure provides a flow limiter valve assembly comprising a housing defined by an end cap and a guide base, a fluid inlet orifice provided in the base and a fluid outlet orifice in the circumferential wall of the housing, with a fluid flow path defined from the inlet orifice to the outlet orifice; the valve assembly further comprising a spool mounted in the base of the housing and arranged to be axially moveable relative to the housing end cap; the assembly further comprising biasing means to bias the spool away from the end cap; the assembly being such that when the biasing means biases the spool away from the end cap, the fluid flow path is defined by a gap between the end cap and the spool such that fluid can flow from the inlet orifice through this gap to the outlet orifice, and wherein the biasing means and spool are arranged and configured such that when a pressure differential greater than a predetermined pressure differential is created across the inlet orifice, the spool is caused to move axially against the force of the spring until the spool abuts against the end cap thus closing the gap and, thereby, closing the flow path between the inlet orifice and the outlet orifice.

The biasing means is preferably a spring.

The end cap preferably extends axially in a direction of the housing towards the base terminating in a tapered point against which the spool abuts when the spring is compressed by the pressure differential exceeding the predetermined pressure differential value.

The housing is preferably cylindrical.

The invention may also reside in a method of limiting fluid flow by causing a spool to move axially relative to an opposing surface such that in response to fluid flow rate exceeding a given value the spool abuts against the opposing surface to prevent fluid flow between the spool and the surface.

DETAILED DESCRIPTION

Figure 1A:
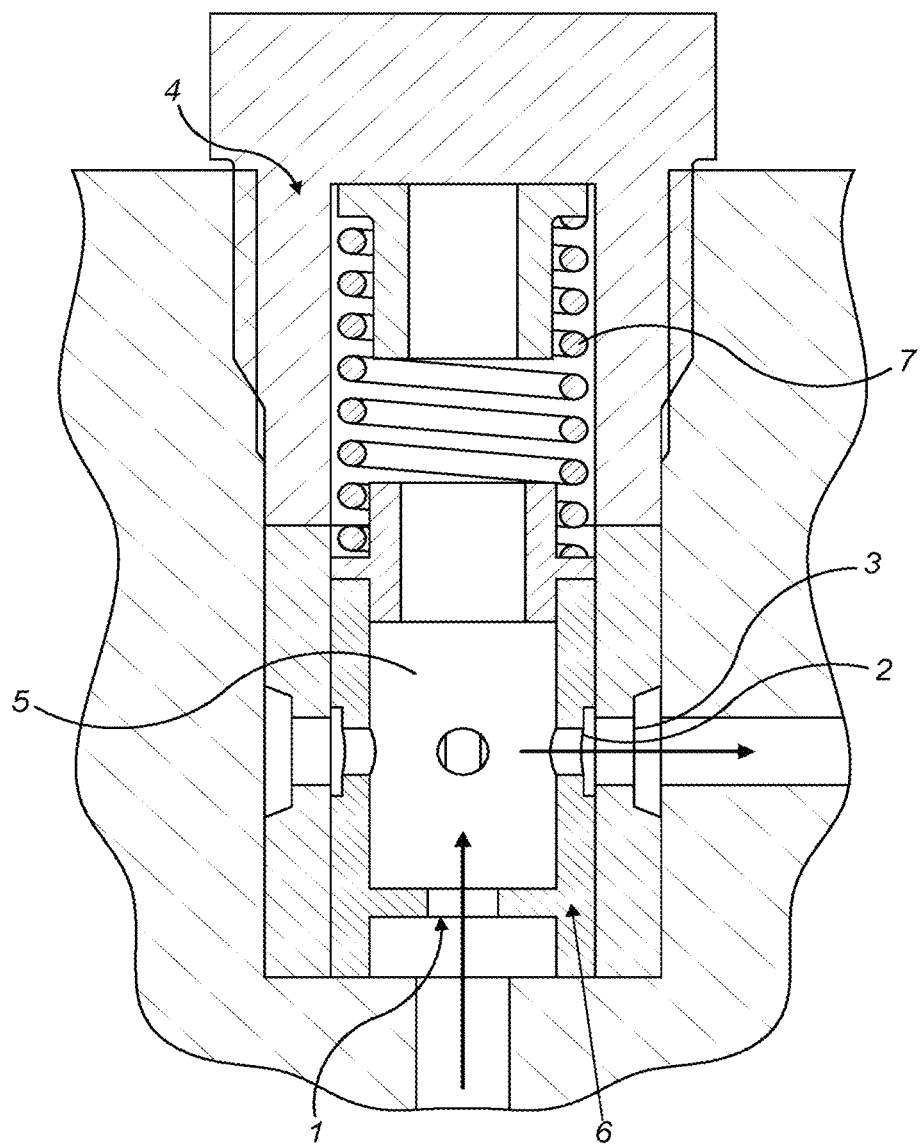
FIGS. 1A and 1B show a conventional flow limiter valve in the open (FIG. 1A) and closed (FIG. 1B) positions.
Figure 1B:
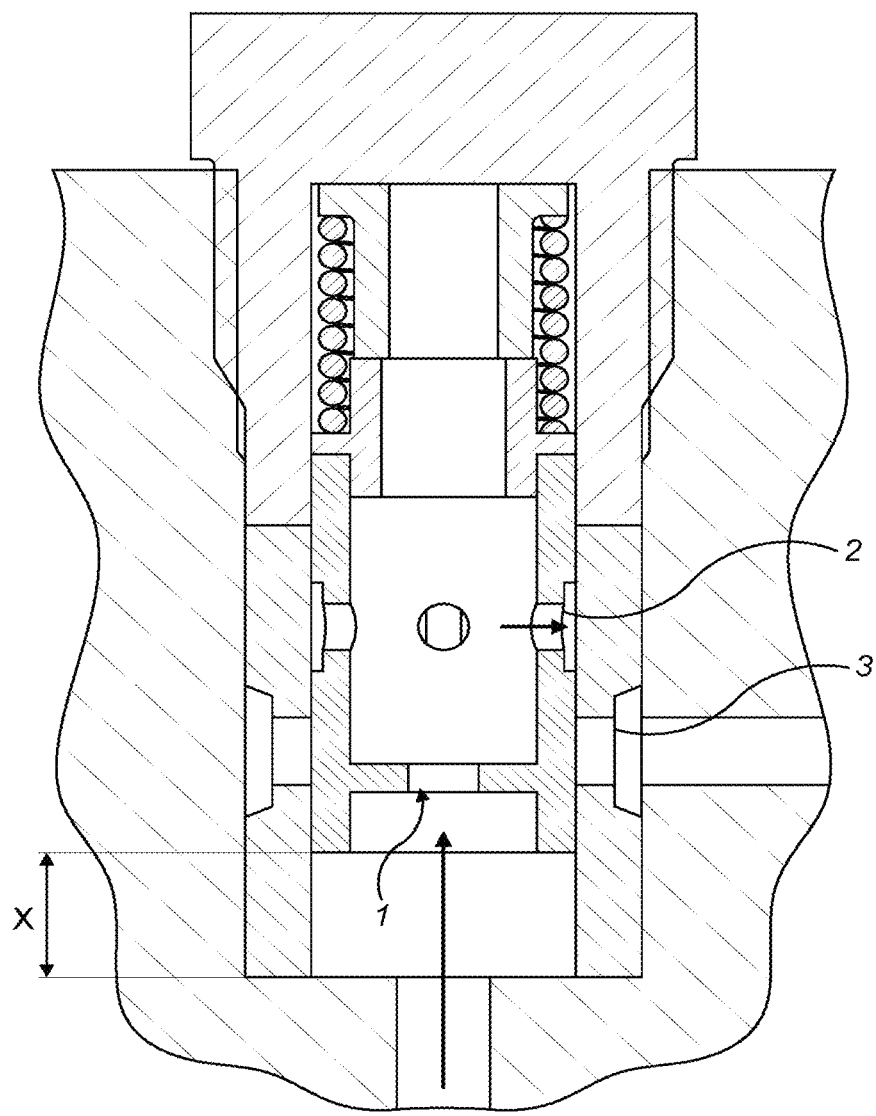
Figure 2A:
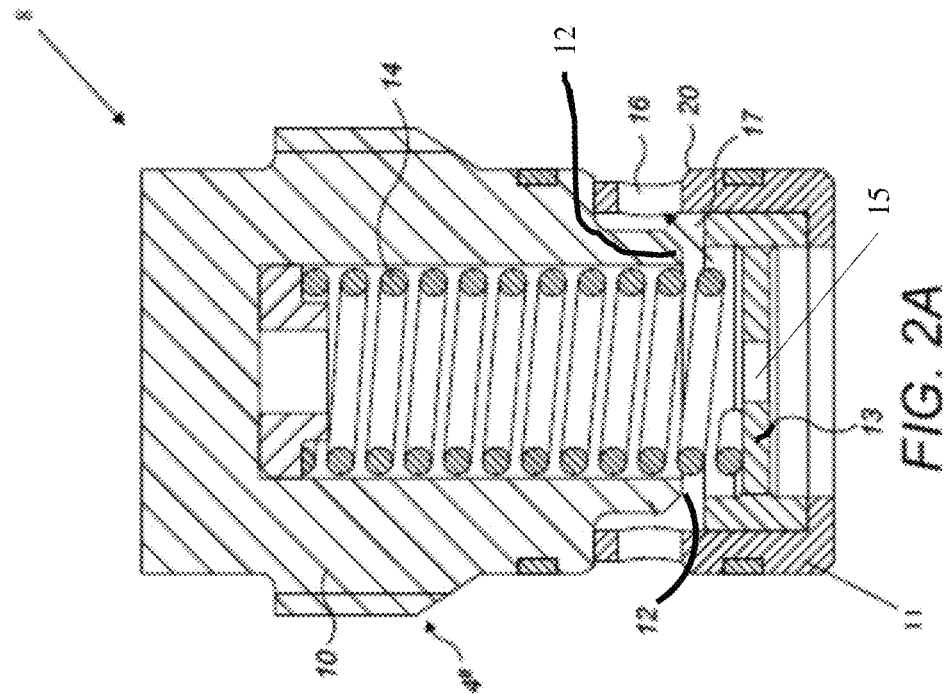
FIGS. 2A and 2B show a cross-sectional view of the flow limiter valve according to this disclosure in the open (FIG. 2A) and closed (FIG. 2B) positions.
Figure 2B:
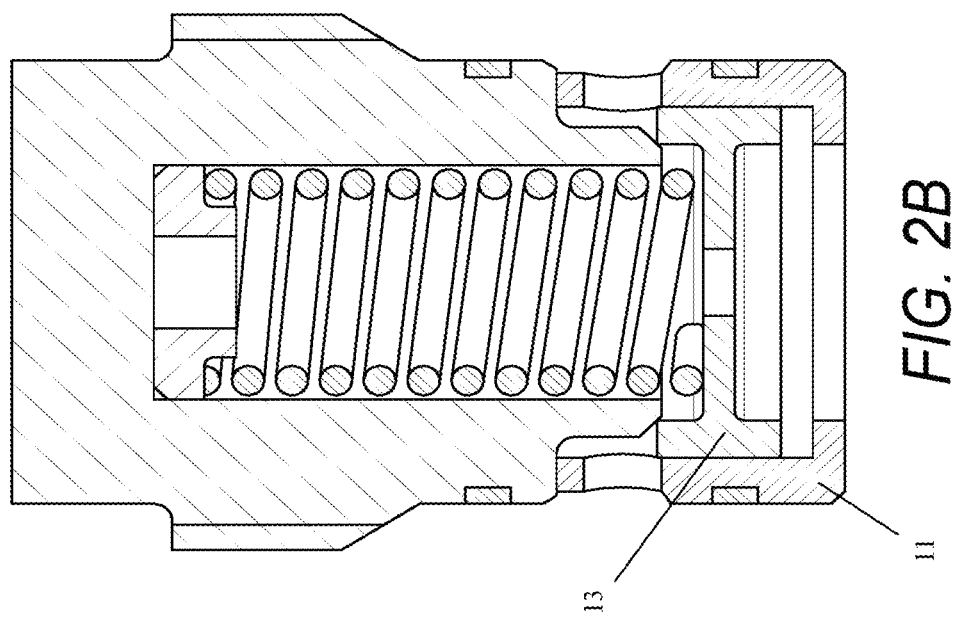
Figure 3A:
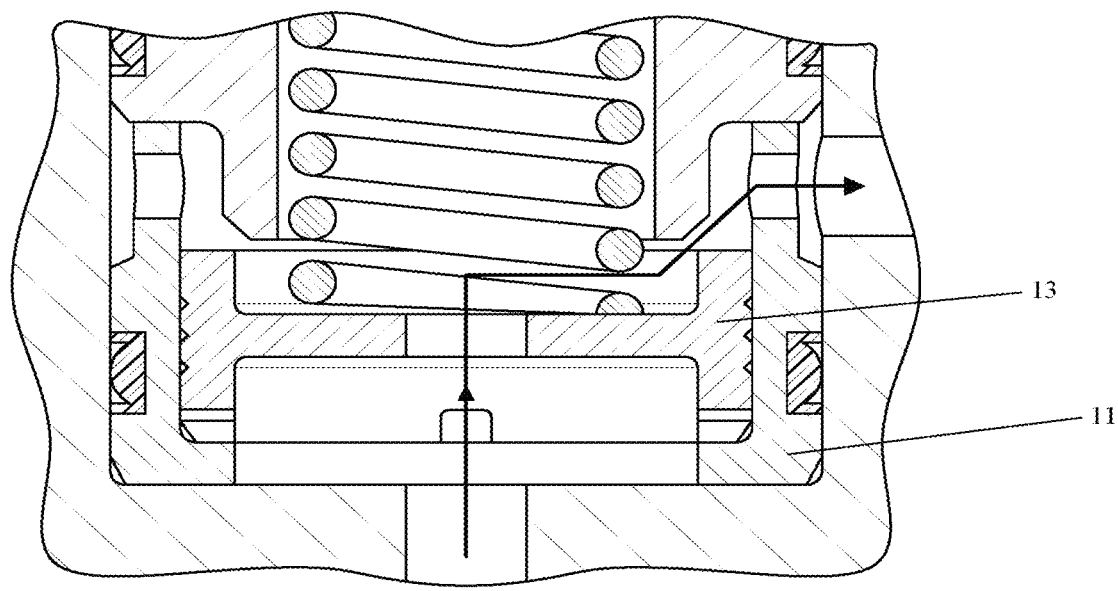
FIGS. 3A and 3B show the lower part of FIGS. 2A and 2B, respectively, in magnified form.
Figure 3B:
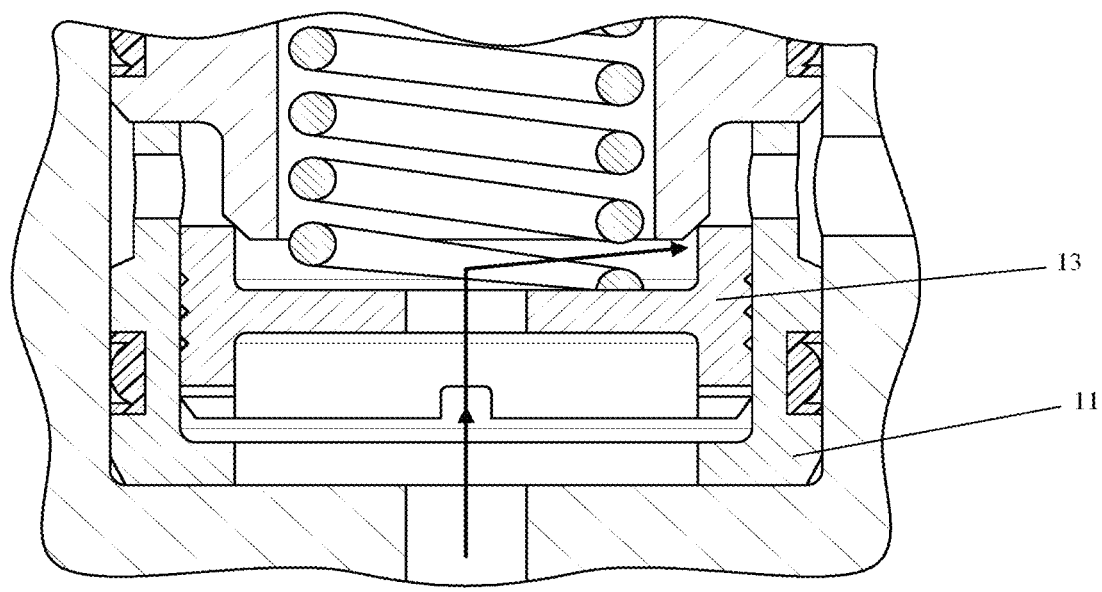
Figure 4:
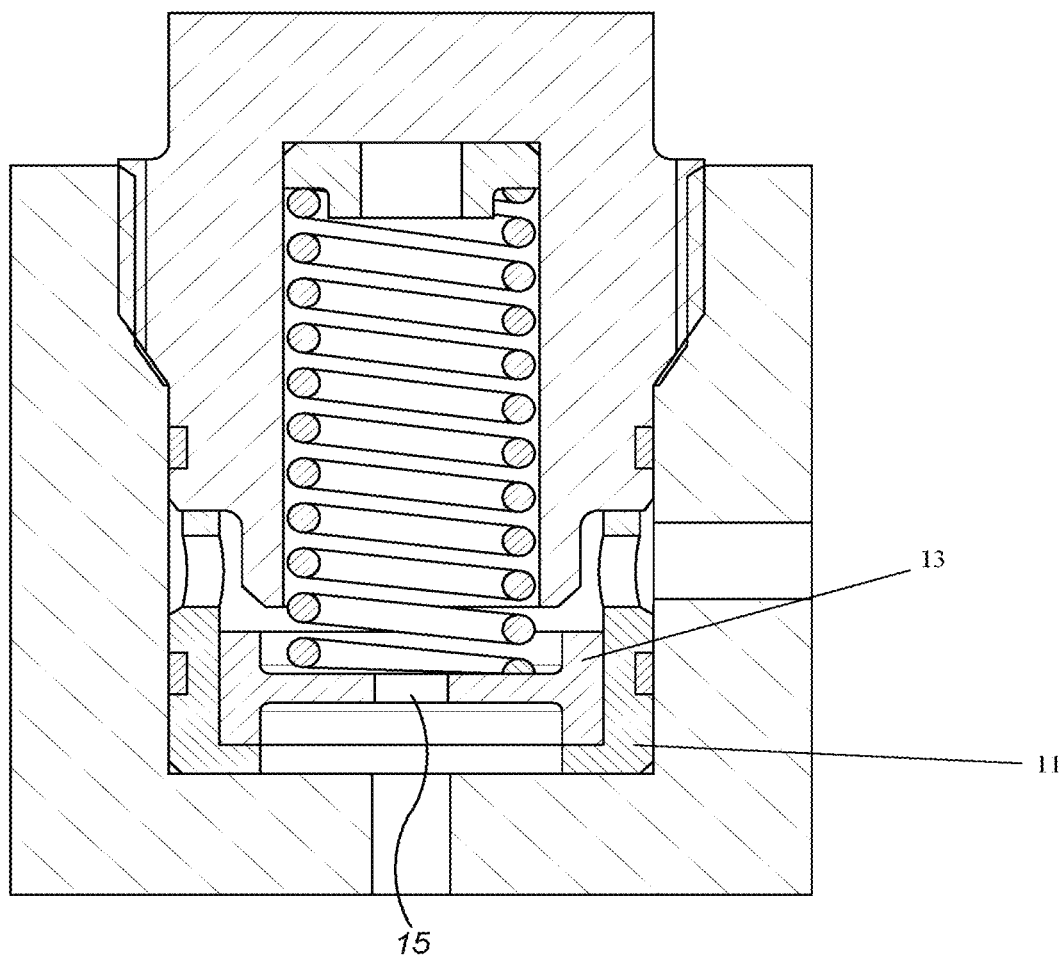
FIG. 4 shows a sectional view of a flow limiter valve according to the invention.

With specific reference, in particular, to FIGS. 2 to 4, it can be seen that the valve 8 of the present disclosure comprises a preferably cylindrical housing 4" comprising an axially extending end cap 10 and a guide base 11.

In the preferred embodiment, the open end 12 of the end cap 10 is tapered to form a conical shape. A sliding spool 13 is mounted in the guide base 11 and the spool 13 and the guide base 11 are arranged to be axially moveable relative to the end cap 10.

The guide base 11 and spool 13 are biased in an open (downward in the drawings) position by means of a biasing member which is preferably a spring 14.

The sliding spool 13 is provided with an inlet orifice or so-called control orifice 15 (see FIG. 4) in communication with a fluid supply (not shown) on one side and with a fluid flow path through the housing indicated by the arrows in FIGS. 2A and 2B.

The control orifice 15 is a typical orifice in a thin wall that generates a pressure differential. It is a typical hydraulic feature and is commonly used to sense a flow. Any change in flow generates a certain pressure differential. This is described by following equation:

$$Q = A_O \cdot Cd \cdot \sqrt{\Delta p \frac{2}{\rho}}$$

Q—flow rate
$A_O$—inlet orifice cross section area
Cd—discharge coefficient
Δp—pressure differential
ρ—fluid density The fluid flow path comprises the inlet orifice 15 and an outlet orifice 16 defined in the circumferential wall of the housing, the inlet orifice and the outlet orifice connected via a fluid flow path through a gap 17 defined between the end 12 of the end cap 10 and the guide base 11 in the open position as shown in FIG. 2A. When the rate of fluid flowing into the valve 8 increases, this creates a pressure differential at the inlet or control orifice 15. When the fluid rate increases beyond a predetermined threshold value, the pressure differential is such as to cause the spring 14 to contract. The spool 13 and base 11 slide axially towards the end 12 of the end cap 10 (i.e. upwards in the drawings) until the guide base abuts against the end 12 of the end cap shown in FIG. 2B. This then cuts off the flow path between the inlet orifice and the outlet orifice, preventing fluid flow out of the valve.

As the pressure differential is removed due to a decrease in flow rate, the spring 14 is able to expand again, moving the sliding spool 13 and guide base 11 away from the end 12 of the end cap thus opening the fluid path between the inlet orifice and the outlet orifice again.

Figure 5:
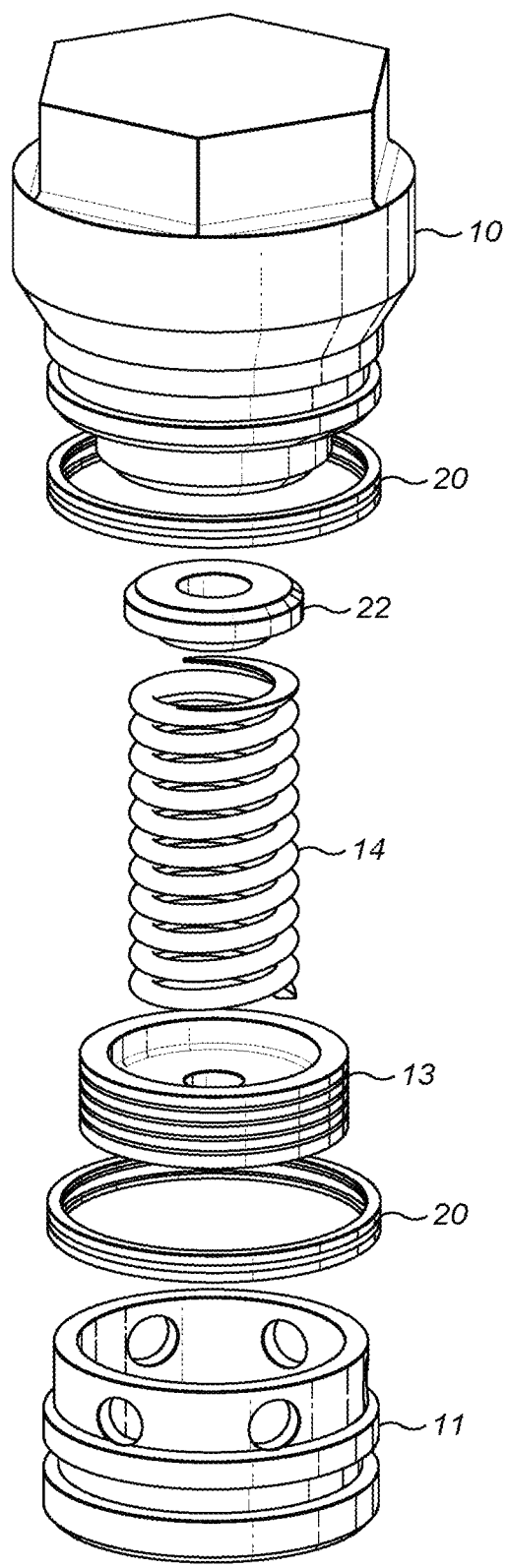
FIG. 5 shows an exploded view of a flow limiter valve according to the invention.

FIG. 5 shows the above described components in an exploded view, also showing preferred seals 20 and a spring seat 22.

Figure 6:
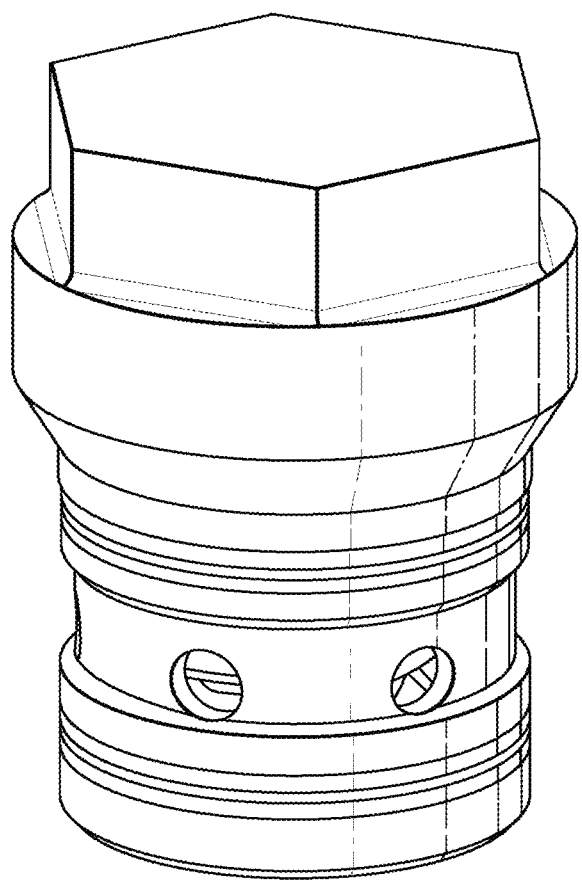
FIG. 6 shows a perspective outside view of the flow limiter valve of this disclosure.

FIG. 6 shows the valve in perspective view.

During closing, the valve 8 of the present disclosure works, essentially, as a poppet valve. The inlet orifice 15 generates a pressure differential. This creates a force acting against the biasing member or spring 14, causing the spool 13 to slide to meet the end cap 10. The circumferential edge of the spool seats against the end cap, preferably against a tapered end of the end cap, therefore cutting off the fluid flow.

The flow limiter valve 8 operates according to the following force equilibrium equation:

$$A_S \Delta p = P_{sp}$$

$A_S$—cross section area of sliding spool
Psp—spring force
Δp—pressure differential across inlet orifice Thus, in contrast to the existing systems wherein the excess pressure from the excessive fluid flow rate causes the slider to move the components of the fluid flow path out of alignment, in the present invention, the excess pressure causes the spool 13 to move to block off the fluid flow path or close the path.

With the valve of the present disclosure, the spool has to travel less distance to cut off fluid flow than in the prior art arrangement and this smaller travel together with the possible smaller spool mass results in the valve being more quickly responsive to pressure changes. The distance the spool has to travel can be less than the diameter of the outlet orifice 16.

The valve of the present disclosure also requires fewer and smaller parts which allows the assembly to be manufactured at lower cost. The assembly is also lighter and more compact.

As compared to the prior art arrangement, the present arrangement requires only two orifices, rather than three, to define the fluid flow path which means that there is less general pressure drop in the valve when the valve is fully open.

The poppet valve closing arrangement of the present disclosure also ensures that there is no leakage when the valve is closed, particularly when the end of the end cap is tapered or conical and the edge of the spool seats against this tapered form.

The invention claimed is:

1. A flow limiter valve comprising a cylindrical housing having an axial length defined by an end cap and a guide base;
    an outlet orifice in a circumferential wall of the guide base, wherein the circumferential wall surrounds the end cap and is circumferential with respect to the axial length;
    a spool having an axially positioned inlet orifice and being mounted in the guide base of the housing and arranged to be axially moveable relative to the housing end cap;
    biasing means configured to bias the spool away from the end cap;

a fluid flow path being defined from the axially positioned inlet orifice where the fluid moves axially into the axially positioned inlet orifice and then, via a bend relative to a direction of the axial length that bends radially outward towards the circumferential wall of the guide base, the fluid moves through a gap between the end cap and the spool and radially outward through the outlet orifice, and wherein the biasing means and spool are arranged and configured such that when a pressure differential greater than a selected first pressure differential is created across the inlet orifice, the spool is caused to move to decrease the gap and, thereby, decreasing fluid flow through the flow path;

wherein the end cap extends axially in a direction of the housing towards the guide base, wherein the end cap terminates at a tapered pointed end defining a conical end surface of the end cap;

wherein the gap is defined between the tapered pointed end and a corner of the spool;

wherein the spool defines a surface at 90 degrees to the tapered pointed end and such that the gap is defined by the conical surface that is defined the tapered pointed end and the spool surface that is at 90 degrees to the tapered pointed end; and where the tapered pointed end of the end cap is caused to abut against the corner of the spool when the pressure differential exceeds a second selected pressure differential value, thus preventing fluid flow.

2. The flow limiter valve of claim 1, wherein the biasing means comprises a spring.

3. A method of limiting fluid flow in a flow valve of claim 1, the method comprising:

moving the spool relative to the surface in response to fluid flow rate through the spool exceeding a selected value; and decreasing the gap defined by the conical surface that is defined by the tapered point and the spool surface that is at 90 degrees to the tapered point to reduce fluid flow rate between the spool and the surface.

4. The method of claim 3, wherein the spool is moved axially.

* * * * *